United States Patent Office 3,564,364
Patented Feb. 16, 1971

3,564,364
MULTIPHASE INDUCTION MOTOR
Alfred Neff, Remscheid, Germany, assignor to Gebruder Honsberg, Remscheid-Hasten, Germany
Filed Sept. 16, 1968, Ser. No. 759,868
Claims priority, application Germany, Sept. 15, 1967, P 16 13 936.9
Int. Cl. H02k 17/02
U.S. Cl. 318—207                                4 Claims

ABSTRACT OF THE DISCLOSURE

A polyphase electric motor and a polyphase electric power supply line having a wire connected to each phase of the motor and contact free switch means for controlling the energy supply to the coils and consisting of normally non-conductive semiconductors in series with each motor coil. Each semiconductor has a control terminal sensitive to direct current voltage to make it conductive and a supply of direct current for connection to the terminals. By various combinations of coils the motor can be made to run at high speed or low speed and in either forward or reverse direction.

---

The present invention relates to a polyphase induction motor with means for controlling the same in a contactless manner, said means including AC semiconductors for controlling the winding of the polyphase induction motor.

With heretofore known polyphase induction motors having devices for controlling the same in a contactless manner, the motor is always controlled by means of AC semiconductors arranged between the network and the motor. In this connection, a direct voltage furnished by a contactless system controls an oscillator through the intervention of an input network, and the oscillator converts the direct voltage into transformable voltage. This is necessary in order to be able for purposes of avoiding a phase short circuit, to galvanically separate the individual control sets from each other. This voltage is transformed through a transmitter and controls the controllable AC semiconductors. The devices for controlling multiphase induction motors in a contactless manner have, therefore, been relatively expensive. When the multiphase induction motor is to be reversible, two of the above described circuits are required, namely, one for controlling the motor for clockwise direction, and one for controlling the motor for counterclockwise direction. In this connection it is also to be borne in mind that at least a time delay of from 10 msec. (at 50 Hz.) has to occur between the shifting from clockwise direction to counterclockwise direction and vice versa. Thus, due to the fact that the semiconductors extinguish only at the phase 0 passage point which leads to short circuit or phase short circuit when the other turning direction is made effective too fast. The heretofore known circuits, therefore, additionally comprise delaying circuits in order to prevent a phase short circuit by too fast a shiftover. The heretofore known polyphase induction motors with a device for controlling the motor in a contactless manner are, therefore, very complicated and expensive.

It is, therefore, an object of the present invention to provide a polyphase induction motor with means for controlling the same in a contactless manner, which will overcome the above mentioned drawbacks.

It is another object of this invention to provide an arrangement, as set forth in the preceding paragraph, which will make it possible without risking a short circuit or a phase short circuit to control the AC semiconductors by means of an ordinary output direct voltage.

These and other objects and advantages of the invention will appear more clearly from the following specification in connection with the accompanying drawings, in which:

FIG. 1 is a diagrammatic illustration of a polyphase motor for one direction of rotation with a control device according to the invention.

FIG. 2 diagrammatically illustrates an arrangement according to the invention for a multiphase reversible motor.

The multiphase induction motor according to the invention is characterized primarily in that the AC semiconductors are arranged between the windings and the neutral point of the motor.

By this arrangement of the AC semiconductors between the windings and the neutral point, it will be assured that without the danger of a short circuit or phase short circuit, it will be possible to control the AC semiconductors at a normal output voltage and thereby to turn on and off the motor. In this way the voluminous circuits heretofore used are necessary for obtaining the galvanic separation that can be eliminated.

In order to design the multiphase induction motor for reversible operation, it is suggested in conformity with the present invention that the motor is equipped with a winding for clockwise as well as counterclockwise direction while each of said windings is, on the side of the neutral point, provided with an AC semiconductor. The semiconductors for clockwise and counterclockwise rotation may together be connected to the source of voltage. Due to the increased resistance caused by the motor preceding the semiconductors, no short circuit or phase short circuit can occur even if both controls should become effective for a short period of time.

In this connection the invention specifically provides that the AC semiconductor for the intermediate winding is connected to the control voltage source through the intervention of oppositely arranged diodes.

With a multiphase induction motor with pole reversal for slow and fast drive respectively, the invention provides that the windings arranged in pairs are connected at the neutral point side to an AC semiconductor. The alternating current semiconductors for fast drive and the alternating current semiconductors for low speed are respectively connected to the source of control voltage.

Figure 1:
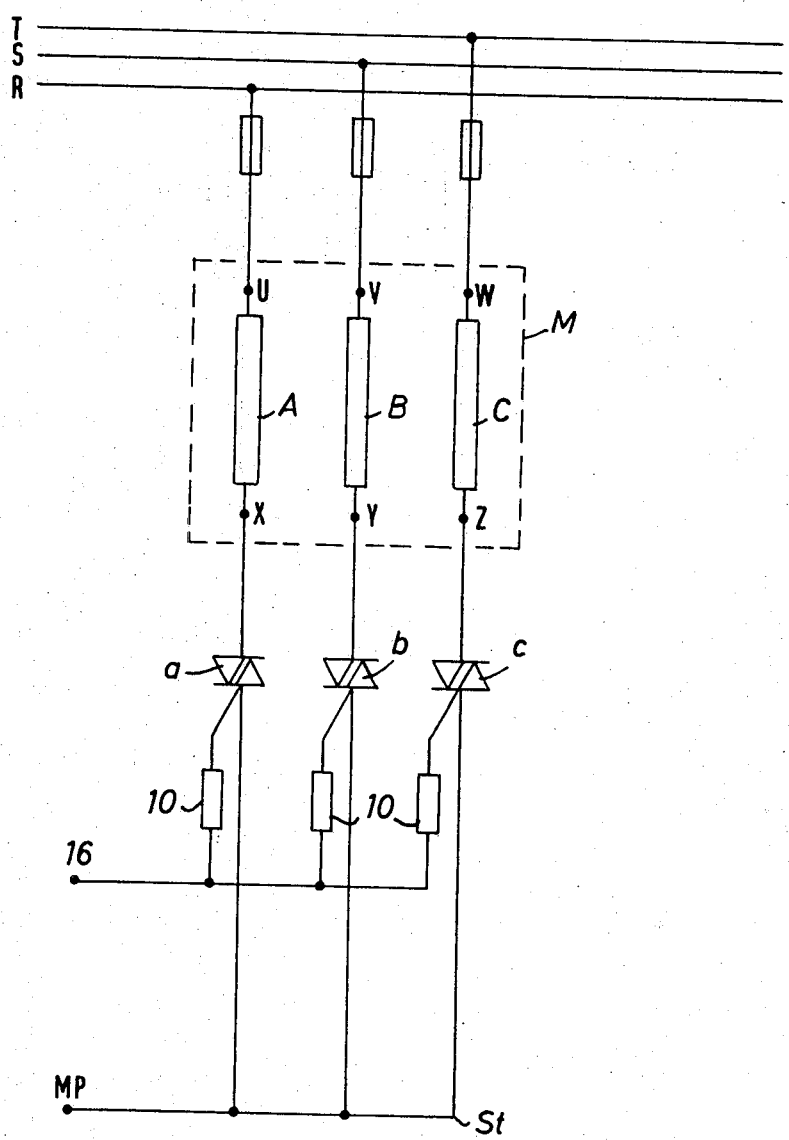

Referring now to the drawings in detail, the polyphase induction motor M shown diagrammatically in FIG. 1 is provided in customary manner with three coils A, B and C. The input terminals $u$, $v$ and $w$ are respectively connected to the three phases R, S and T of an alternating current network. The output terminals $x$, $y$ and $z$ of the coils A, B and C are connected to the neutral point $St$ through the intervention of alternating current semiconductors (TRIAC) $a$, $b$, $c$ while the zero phase MP is connected in a manner known per se to the neutral point $St$. The connecting terminal for the control voltage of the alternating current semiconductors is designated with the reference numeral 16 and is fed by an ordinary output direct voltage by electronic circuits.

For turning on the multiphase induction motor M, a direct voltage is, from a contactless system through the input terminals 16, conveyed through resistors 10 to the alternating current semiconductors $a$, $b$, $c$ so that the latter become conductive. For turning off the motor, the direct voltage is disconnected from the terminal 16.

Figure 2:
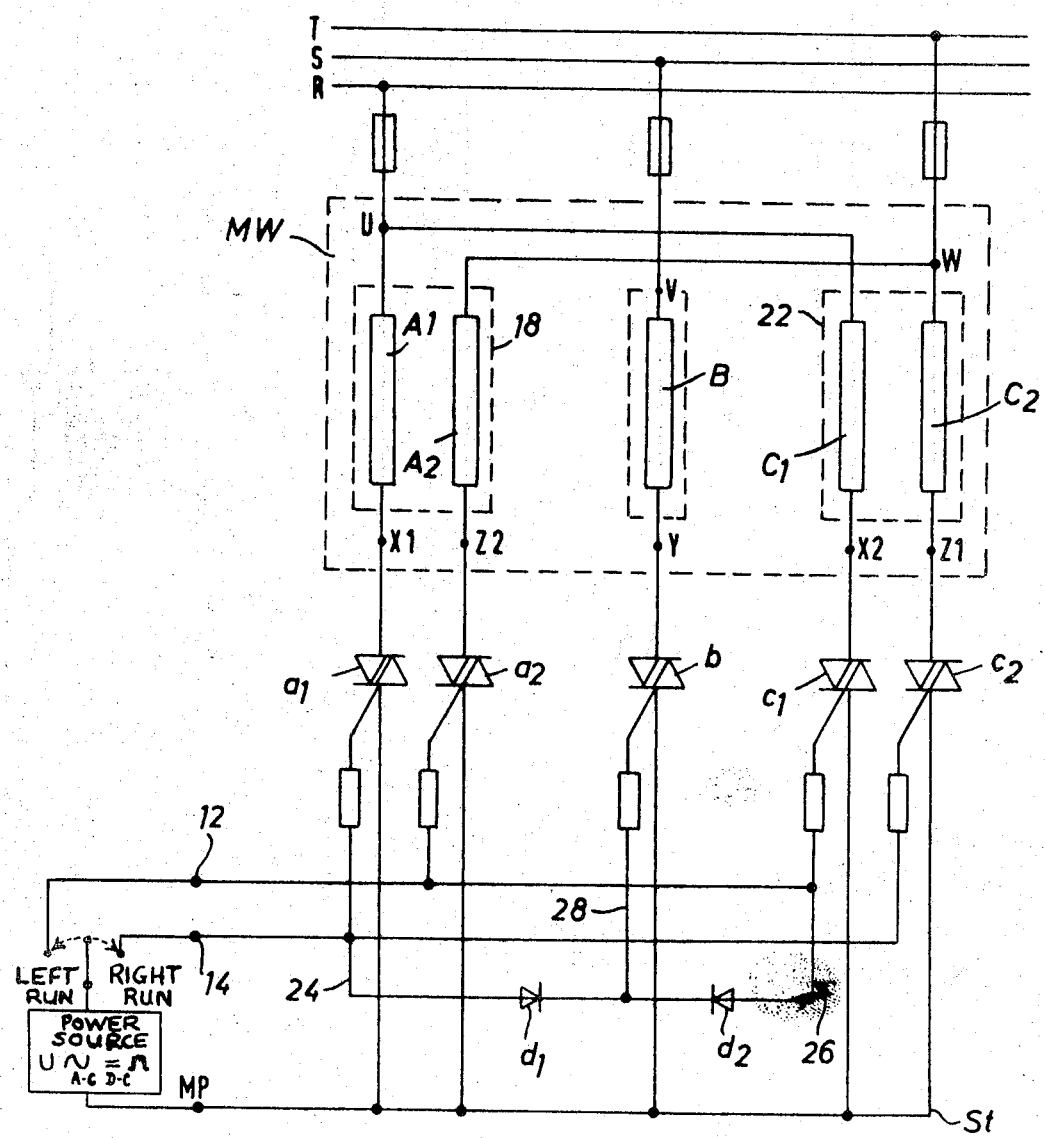

While FIG. 1 shows a multiphase induction motor for one direction of rotation only, FIG. 2 shows a multiphase induction motor MW for reversing operation. As will be seen from the drawings, the coil means generally designated 18 comprise two coils, namely, a coil A1 connected to the phase R, and a coil A2 connected to the phase T. Similarly, the coil means generally designated 22 comprise a coil C1 connected to the phase R and a coil C2 connected to the phase T. The coil B connected to the phase S need only be single.

The output terminal $x1$, $z2$, $y$, $x2$, $z1$ of the coils A1, A2, B, C1, C2 are connected to the neutral point $St$ through the alternating current semiconductors $a1$, $a2$, $b$, $c1$, $c2$. There are provided two connecting terminals 12, 14 for the control direct voltage while the control direct voltage is connected to the terminal 12 for counterclockwise turning of the motor, whereas the control voltage is connected to the terminal 14 for clockwise turning of the motor. A branch line 26 branches off from the distributing line which is connected to the terminal 12. The branch line 26 has interposed therein a diode $d2$. The branch line 26 is connected to a line 28 for controlling the alternating current semiconductor B during the counterclockwise turning of the motor. Through the intervention of a diode $d1$ which is arranged opposite to the diode $d2$, the line 28 is, through a branch line 24, connected to the control line coming from the terminal 14.

When a direct voltage is connected to the terminal 12, the alternating current semiconductors $a2$ and $c1$ become conductive. At the same time, through line 26 and diode $d2$, and also line 28, also the alternating current semiconductor $b$ becomes conductive. The oppositely arranged diode $d1$ prevents the control current from passing into the branch line 24. The motor will be rotated in counterclockwise direction.

If, however, a control direction voltage is connected to the terminal 14, the alternating current semiconductors $a1$ and $c2$ become conductive, whereas simultaneously through line 24 the diode $d1$ and the line 28, the alternating current semiconductor $b$ again becomes conductive. In this instance, the diode $d2$ prevents a flow of current into the line 26.

In view of the dampening of the semiconductors by the preceding motor MW a short circuit or phase short circuit can never occur even if for a short period both controls 12 and 14 should become effective.

Figure 3:
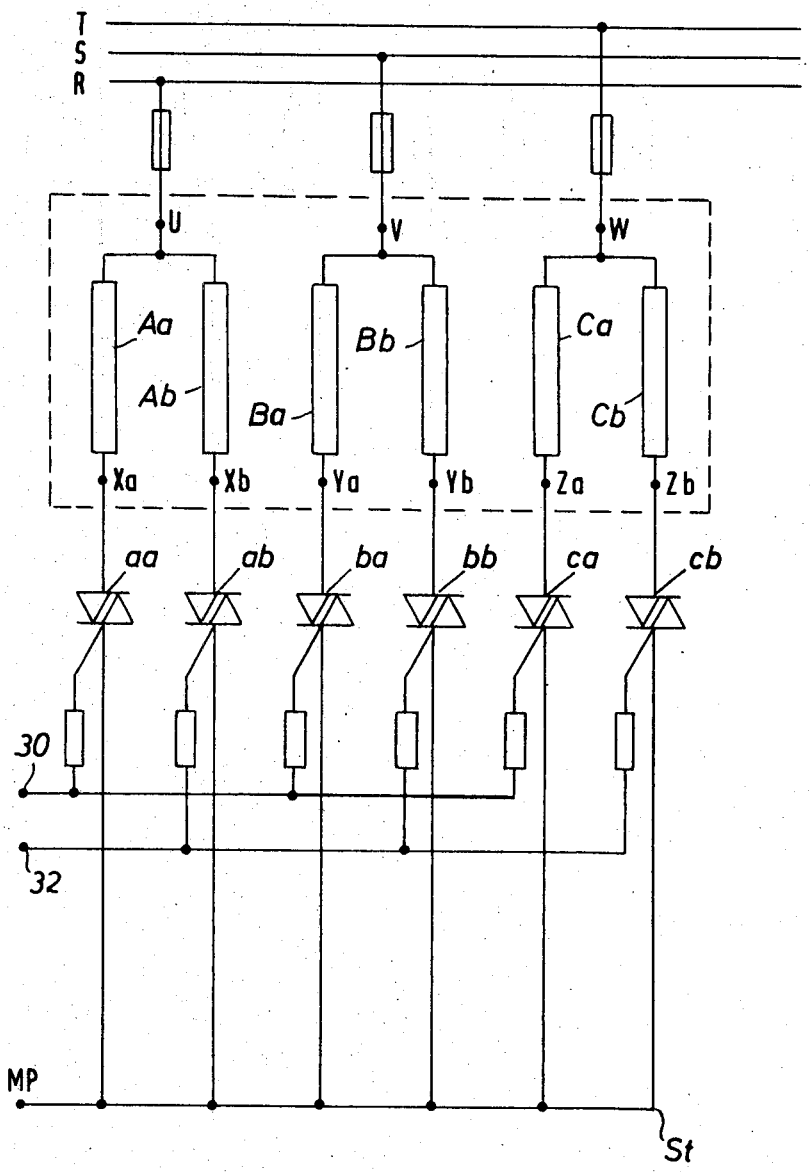
FIG. 3 illustrates the arrangement for a polyphase motor with pole reversal.

FIG. 3 shows a motor with a device for pole reversal for slow and fast drive respectively. A control direct voltage connecting terminal 30 serves for shift to slow drive, and a control direct voltage connecting terminal 32 serves for shifting to fast drive. When the control direct voltage is connected to the terminal 30, the alternating current semiconductors $aa$, $ba$, $ca$ become conductive so that the coils A$a$, B$a$ and C$a$ are passed through by the current. If, however, a control direct voltage is connected to the terminal 32, the alternating current semiconductors $ab$, $bb$, and $cb$ become conductive so that the coils A$b$, B$b$, and C$b$ become conductive.

Figure 4:
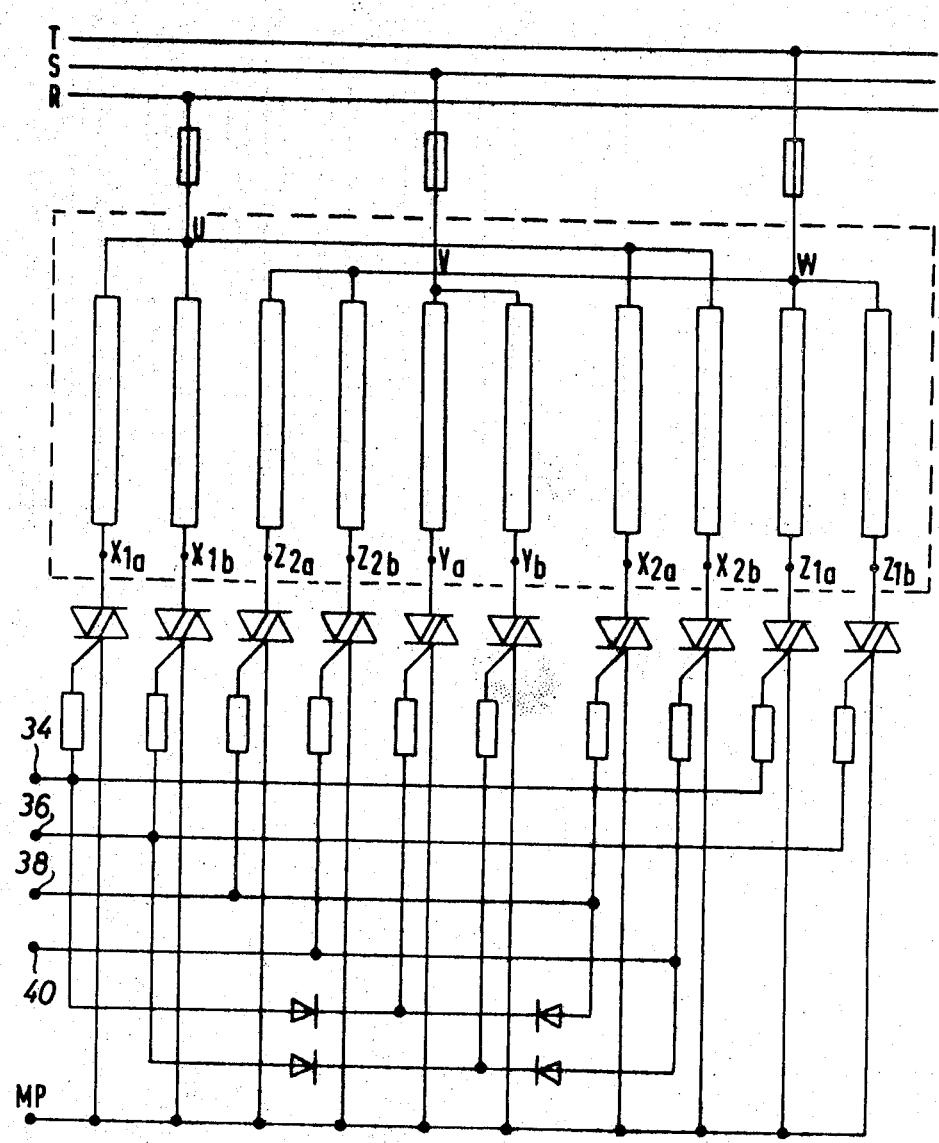
FIG. 4 shows an arrangement for a reversible polyphase induction motor with pole reversal.

The embodiment illustrated in FIG. 4 is a combination of the circuits shown in FIGS. 2 and 3 which means that FIG. 4 comprises a polyphase induction motor which is designed for pole reversal and also for reversal of direction. When the control direct voltage is connected to the terminal 34, the motor turns slowly in clockwise direction. When the control voltage is connected to the terminal 36, the motor runs at high speed in clockwise direction. When the control voltage is connected to terminal 38 the motor turns at a low speed in counterclockwise direction, and when the control voltage is connected to the terminal 40 the motor runs at high speed in counterclockwise direction. The operation of this device will be evident from the preceding description in FIGS. 2 and 3.

It is, of course, to be understood that the present invention is, by no means, limited to the particular arrangements shown in the drawings, but also permits various modifications, the invention being determined by the scope of the appended claims.

What is claimed is:

1. In a motor control circuit: a polyphase induction electric motor having coil means for each phase, a polyphase alternating current supply comprising a wire for each phase, said wires being connected to said coil means to supply electric current thereto, and contact free switch means for controlling the supply of energy from said wires to said coils and comprising semiconductor means in series with said coil means respectfully, said semiconductor means being normally nonconductive and each having a control terminal sensitive to a direct current voltage to make the pertaining semiconductor conductive, and control wire means connected to said control terminals for supplying on-off operation direct current voltage to said control terminals, said motor and the said supply are three phase and said coil means for each of two of said motor phases comprise a pair of coils, the coils of each said pair being connected to respectively different ones of a selected pair of the wires of said supply, the coil means for the third phase of said motor being connected to the third wire of said supply, a first control wire connected to the control terminal of the semiconductor for the third phase of said motor and to the control terminals of the first pair of semiconductors for the respective coils of said pairs of coils which are connected to respectively different ones of said selected pair of wires for supplying direct current voltage to the said terminals for one direction of reversible rotation of said induction motor, and a second control wire connected to the control terminals of the second pair of semiconductors for the other coils of said pairs of coils and to the control terminal of the semiconductor for said third motor phase for supplying direct current voltage thereto for the opposite direction of reversible rotation of said induction motor.

2. In a motor control circuit: a polyphase induction electric motor having coil means for each phase, a polyphase alternating current supply comprising a wire for each phase, said wires being connected to said coil means to supply electric current thereto, and contact free switch means for controlling the supply of energy from said wires to said coils and comprising semiconductor means in series with said coil means respectfully, said semiconductor means being normally nonconductive and each having a control terminal sensitive to a direct current voltage to make the pertaining semiconductor conductive, and control wire means connected to said control terminals for supplying on-off operation direct current voltage to said control terminals, said induction motor and the said supply are three phase and the coil means of each phase of the motor comprises first low speed coil means for a slower speed of the motor and second coil means for a higher speed of the motor with pole reversal, a first group of semiconductors for said first low speed coil means and a second group of semiconductors for said second high speed coil means, a first control wire to supply said direct current voltage to the control terminals of the said first group of semiconductors for slower speed rotation of said motor, and a second control wire to supply said direct current voltage to the control terminals of the said second group of semiconductors for higher speed rotation of said motor induction.

3. A motor control system according to claim 2 in which the said first low speed and second high speed coil means for a first phase of said motor comprises a forward low speed coil and a forward high speed coil connected to a first wire of said supply and a reverse low speed coil and a reverse high speed coil connected to a second wire of said supply and the said first low speed and second high speed coil means for a second phase of said motor comprises a forward low speed coil and a forward high speed coil connected to said second wire of said supply and a reverse low speed coil and a reverse high speed coil connected to said first wire of said supply, a said semiconductor in series with each of the low speed forward coil and the low speed reverse coil and the high speed forward coil and high speed reverse coil of each of said first and second phase of the motor and with each of the low speed coil means and high speed coil means of the third phase of said motor, a first control wire leading to the control terminals of the semiconductors for the low speed forward coils of said first and second phases of the motor and to the low speed coil means of said third phase, a second control wire leading to the control terminals of the low speed reverse coils of said first and second phases of said motor and to the semiconductor for the low speed coil means for the third phase of the motor, a third control wire leading to the control terminals of the semiconductors for the high speed forward coils of said first and second motor phases and to the control terminal of the semiconductor for the high speed coil means of said third phase, and a fourth control wire leading to the control terminals of the semiconductors for the high speed reverse coils of the first and second phases of the motor and to the control terminal of the semiconductor for the high speed coil means of the third phase of the said motor reversible and changeable in speed.

4. A motor control system according to claim 3, which includes a diode in the connection of each said control wire to the control terminal of the respective semiconductor for the coil means of the third phase of the reversible inductance motor.

References Cited
UNITED STATES PATENTS

| | | | |
|---|---|---|---|
| 3,226,621 | 12/1965 | Heinemann et al. | 318—224 |
| 3,360,706 | 12/1967 | Wooldridge, Jr. | 318—305 |
| 3,394,297 | 7/1968 | Risberg | 318—227 |
| 3,430,122 | 2/1969 | Krabbe et al. | 318—207 |

ORIS L. RADER, Primary Examiner

K. L. CROSSON, Assistant Examiner